Jan. 13, 1942.　　A. E. W. JOHNSON　　2,269,977
HARVESTER-THRESHER
Filed Sept. 22, 1939　　2 Sheets-Sheet 1

Inventor
Arnold E. W. Johnson
By Paul O. Pippel
Atty.

Jan. 13, 1942.  A. E. W. JOHNSON  2,269,977
HARVESTER-THRESHER
Filed Sept. 22, 1939    2 Sheets-Sheet 2

Inventor
Arnold E. W. Johnson
By Paul O Pippel
Att'y.

Patented Jan. 13, 1942

2,269,977

UNITED STATES PATENT OFFICE 2,269,977

HARVESTER-THRESHER

Arnold E. W. Johnson, Chicago, Ill., assignor to International Harvester Company, a corporation of New Jersey Application September 22, 1939, Serial No. 296,103

8 Claims. (Cl. 56—122)

This invention relates to a harvester thresher. More particularly it relates to a harvester thresher with a folding platform.

It has been known to provide a harvester thresher with a folding platform. It has been found desirable to design a harvester thresher in which a threshing cylinder is immediately adjacent a harvester platform, and the platform is foldable.

An object of the present invention is to provide an improved harvester thresher.

A further object is the provision of a harvester thresher having a foldable platform and a thresher cylinder immediately adjacent the platform.

A further object is to provide a harvester thresher having a foldable platform with an auger conveyer and a thresher cylinder immediately adjacent the end of the auger conveyer.

The harvester thresher of the present invention comprises a thresher cylinder, a foldable harvester platform extending from the cylinder, and the auger feed foldable with the platform and extending into immediate adjacency with the thresher cylinder so as to feed thereinto.

Figure 3:
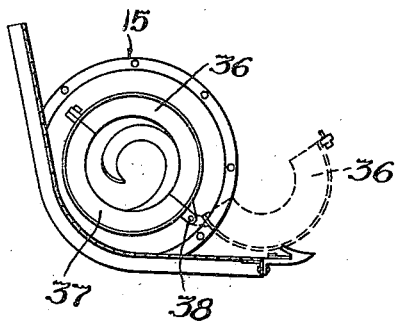
Figure 3 is a section taken along the line 3—3 of Figure 1 showing only the harvester platform and the parts of the thresher unit at its receiving opening.

The harvester thresher of the present invention includes an axle 10 supported on wheels 11 and 12, a draw-frame structure 13, a harvester platform 14, a thresher unit 15, and a separator unit 16. The separator unit 16 is not shown in detail, since it forms no part of the present invention but may be of the form shown in the patent to Bunting, 1,222,730, dated April 17, 1917. A frame structure 18 extends forwardly from the axle 10 and carries a pair of alined pivot pins, of which only one indicated by 19 is shown, the other pivot pin being in alinement with the one pin and under the thresher part adjacent the draw-frame structure 13. A frame structure 20 is pivoted on the structure 18 by means of the pins and supports the harvester platform 14 and threshing unit 15. The harvester platform 14 is formed in two sections 21 and 22, and the section 21 being very short and remaining fixed with respect to the frame structure 20 and the section 22 constituting the main part of the harvester platform and being hinged on the section 21 by means of hinge connections 23 and 24, comprising bracket members 23a, 23b, 24a, and 24b attached to the sections 21 and 22 and pins 23c and 24c. The harvester platform 14 has a reciprocating knife structure 25 at its forward end and a reel 26 rotatably carried on a shaft 27 positioned out in front of the platform. An auger conveyer 29 extends along the harvester platform and is supported at the grainward end in the bearing bracket 30 secured to an end piece 31 of the harvester platform. The bearing bracket 30 has a cylindrical portion 32 of considerable length which affords a proper support for the auger. It is strengthened by radial ribs 33. The other end of the auger conveyer has a conical point 35 and extends beyond the platform 14 into a frusto-conical member formed in halves 36 and 37 pivotally attached to one another at 38 so as to open out into the dotted line position of Figure 3. Extending from a point immediately adjacent the conical end 35 of the auger conveyer is a thresher cylinder 39 having a cylindrical section 40 provided with teeth 41 and a conical section 42 provided with a spiral fin 43. The conical portion 42 is within a frusto-conical shell 44 and the cylindrical portion 40 is within a cylindrical shell 45 forming a concave and having teeth 46 cooperating with the teeth 41. The threshing cylinder 40 is keyed to a shaft 47 having a sprocket 48 at one end driven by a chain 49, in turn driven by a sprocket 49a secured to a drive shaft 49b. The shaft 49b is driven by a pulley 49c mounted thereon, in turn driven by a belt 49d, driven by pulley 72, driven by engine 70 mounted on top of the separator unit 16.

A fan 50 immediately adjacent the threshing cylinder 40 is secured to a sleeve 52 rotatably mounted on the shaft 47. The sleeve has a sprocket 53 secured thereto driven by a chain 54, driven in turn by a sprocket 54a secured to the drive shaft 49b. A chain 55 drives a sprocket 56 secured to the shaft 27 of the reel 26. The chain 55 is in turn driven by a sprocket 57 secured to shaft 47 driven by the sprocket 48.

Figure 1:
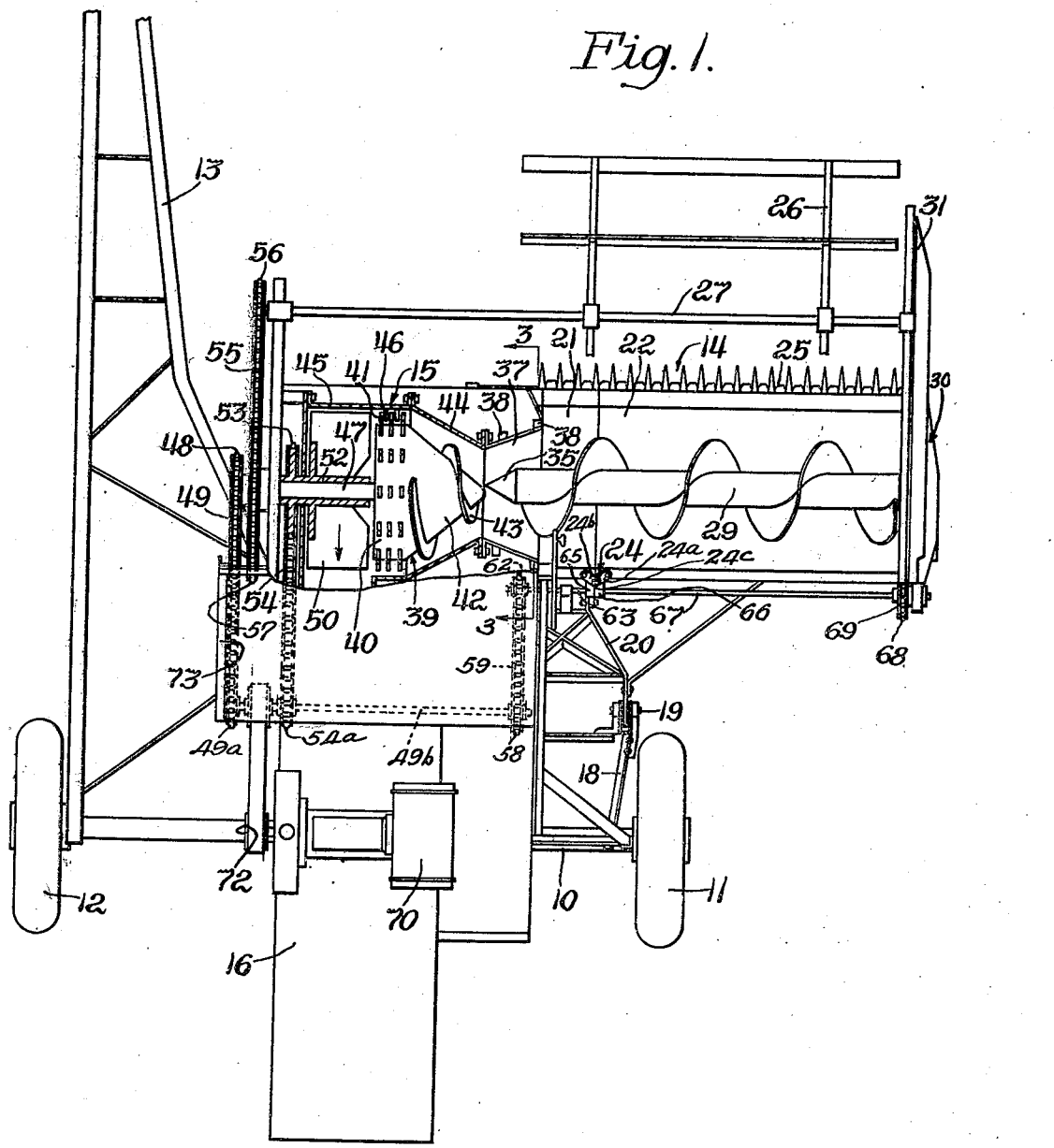
Figure 1 is a plan view of the novel harvester thresher with parts cut away and parts in section, as shown by line 1—1 in Figure 2.
Figure 2:
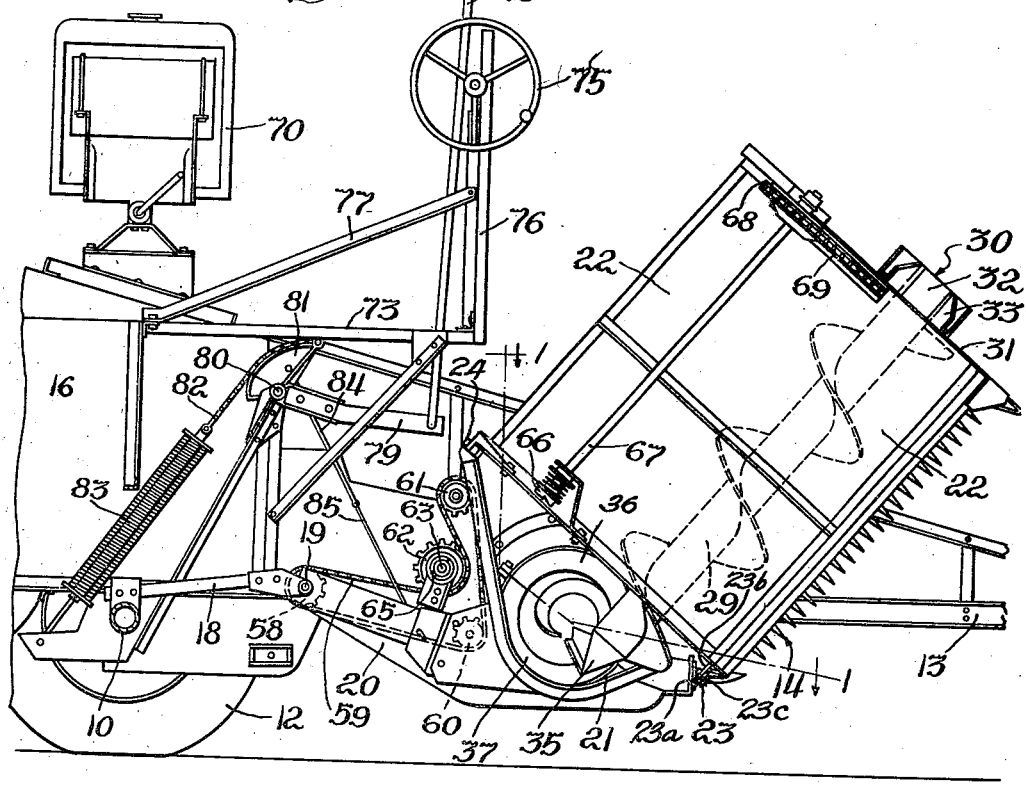
Figure 2 is a side view thereof.

A driving sprocket 58 is secured to the shaft 49b extending through the harvester thresher in alinement with the pin 19. The sprocket 58 drives a chain 59, idlers 60 and 61, and a driven sprocket 62. The sprocket 62 is secured to a shaft 63 having at its end one-half 65 of a jaw clutch. The other half 66 of the jaw clutch is secured to a shaft 67 rotatably mounted on the rear side of the section 22 of the harvester platform. The other end of the shaft 67 carries a sprocket 68 which meshes with a chain 69 having a driving connection with the auger conveyer 29. Because of the hinge connections 23 and 24 between the sections 21 and 22 of the harvester platform, the section 22 is enabled to swing upwardly and forwardly as shown in Figure 2. In this position, the width of the harvester thresher is reduced considerably so as to enable an easier transporting of the harvester thresher. The sections 65 and 66 of the jaw clutch are shown as separated in Figure 2, but when the platform section 22 is swung back to operating position, the sections 65 and 66 are engaged so as to provide a driving connection between the shafts 63 and 67. Thus the auger conveyer 29 is driven by the sprocket 58 through the medium of the chain 59, sprocket 62, clutch sections 65 and 66, shaft 67, sprocket 68, and chain 69.

Engine 70 and driving pulley have previously been mentioned. An operator's platform 73 is provided over the separator unit 16.

Operation of the harvester thresher is in the usual way. It is pulled over the ground by means of the draw-frame structure 13. Grain is batted into the reciprocating knife structure 25, which cuts it and allows it to fall in the platform 14. The auger 29 conveys the cut grain along its length to the threshing cylinder 39, by the spiral fin 43 of which it is moved into engagement with the teeth 41 and 46 which perform the threshing operation. It then passes into the fan 50, whence it is propelled in the direction shown by the arrow into the separator unit 16 where the grain is separated from the straw in the usual way. Details of the separator unit are not shown as they form no part of the present invention.

It will be observed that separate drives have been provided for the threshing cylinder and the fan, the shaft 47 driving the threshing cylinder and the sleeve 52 driving the fan. The drive for the auger conveyer is separate from the drive of either the threshing cylinder or fan. Accordingly, the auger conveyer and fan may be rotated at suitable fixed speeds and the threshing cylinder may be rotated at any suitable speed depending upon the type of grain to be threshed.

When the harvester thresher is to be transported, it is desirable to narrow its width. The upper half 36 of the frusto-conical shell is swung into the dotted line position of Figure 3. The reel 26 and shaft 27 are removed. Finally, the platform section 22 is swung pivotally about the downwardly and forwardly extending axis of the pins of the hinges 23 and 24 upwardly and forwardly to the vertical position shown in Figure 2. The pivot axis of the section 22 is sufficiently above the axis of the auger feed 29 that the conical tip 35 and adjacent portion of the feed clear the section 37 and the section 21 of the harvester platform. Removal of the section 36 provides room for the fin of the auger conveyer 29 when the conveyer and platform are in vertical position.

It will be observed that although the conical tip 35 of the auger conveyer is in immediate adjacency with the conical end 42 of the threshing cylinder, there is no mechanical connection between the conveyer and the threshing cylinder. Consequently, the conveyer and threshing cylinder may be driven at different speeds as conditions may require and the conveyer may swing with the platform section 22 to a vertical position.

If it is desired, the harvester platform 14 and the threshing unit 15 may be moved upwardly away from the ground, pivoting about the axis of the pin 19. Raising is effected by means of a hand wheel 75 supported in members 76 and 77 over the operator's platform 73. This hand wheel has tooth portions, not shown, cooperating with an upright rack bar 78 extending through a hole in the platform 73 and connected to an arm 79. The arm is secured to a shaft 80 to which is also secured a rocker member 81. A chain 82 connects the rocker member 81 and a counterbalancing spring 83. A chain 84 connects the rocker member 81 and a rod 85 connected to the framework 20. When it is desired to raise the harvester platform and the thresher unit, the hand wheel 75 is rotated so as to raise the rack bar 78. This causes the arm 79 to rotate which in turn rotates the rocker member 81. The chain 84 is pulled upwardly by the rocker member 81 and the framework 20 and the rod 25 are also raised, causing raising of the harvester platform and the thresher unit.

It will be apparent from the foregoing description that a new and novel harvester thresher has been provided. The intention is to limit the invention only within the scope of the appended claims.

What is claimed is:

1. A harvester thresher construction comprising a framework, a grain-receiving platform of considerable length, means mounting the platform on the framework for swinging movement with respect thereto about an axis at one end of the platform substantially at right angles to the length thereof, an auger conveyer extending in the direction of the length of the platform and supported adjacent the end of the platform away from the end adjacent the axis about which the platform swings, and a thresher cylinder positioned at the end of the auger conveyor adjacent the axis of the platform about which it swings.

2. A harvester thresher construction comprising a thresher unit, a fan unit, a separator unit, a crop-receiving platform extending from the thresher unit, means mounting the crop-receiving platform for swinging movement upwardly to a folded position, and an auger conveyer positioned on the platform and extending in the direction of the length thereof and having an axis of rotation extending in the same general direction as the axis of rotation of the threshing cylinder.

3. A harvester thresher construction comprising a rotatable threshing element, a driving shaft carrying the threshing element, a crop-receiving platform extending from the threshing element, and a crop-conveying means extending along the platform and supported entirely at an end remote from the threshing element, said means including a shaft provided with a conveying element and extending in general alinement with the driving shaft of the threshing element into immediate adjacency with the element but devoid of mechanical connection with the element and its driving shaft.

4. A harvester thresher construction comprising a rotatable threshing element, a grain-receiving platform, means mounting the grain-receiving platform for swinging movement upwardly to folded position, and an auger conveyor mounted on the platform so as to swing with the platform, said conveyor extending from a point of immediate adjacency with the threshing cylinder in the same general direction as the axis of the cylinder and being devoid of mechanical connection therewith.

5. A harvester thresher construction comprising coaxially positioned thresher and fan units, a first driven shaft for the thresher unit, a second driving shaft for the fan unit sleeved over the first shaft, a separator unit positioned to one side of the fan unit, a crop-receiving platform extending from the thresher unit, means mounting the crop-receiving platform for swinging movement upwardly to folded position, and an auger conveyor supported on the platform at an end remote from the threshing unit and extending in the general direction of the axis of the driving shaft of the thresher and fan units into immediate adjacency with the thresher unit but devoid of contact and connection with the thresher unit and its driving shaft.

6. A harvester thresher construction comprising a thresher unit, a housing formed of sections pivoted to one another and positioned adjacent the thresher unit, a harvester platform extending from the housing, means mounting the harvester platform for swinging movement to a folded position about an axis in the neghborhood of the thresher unit, and an auger conveyer mounted on the platform and having an end portion extending within the housing into feeding relation with the thresher unit.

7. A harvester thresher construction comprising a thresher cylinder, a first housing surrounding the cylinder, a second housing formed of sections pivotally attached to one another and connected to the first housing, a harvester platform extending from the second housing, means mounting the harvester platform for swinging movement to a folded position about an axis at right angles to that of the thresher cylinder and adjacent the second housing, and a feed element having a spiral fin mounted on the platform and having an end portion extending within the second housing into feeding relation with the thresher cylinder, the pivoting of the one section of the second housing with respect to the other section permitting the one section to be swung out of the way to provide room for the fin of the feed element in the folded position of the platform.

8. A harvester thresher construction comprising a rotatable threshing element having a conical extension provided with a spiral rib, a grain-receiving platform, means mounting the grain-receiving platform for swinging movement upwardly to a folded position, and an auger conveyer mounted on the platform so as to swing therewith, said conveyer extending from a point of immediate adjacency with the conical extension of the threshing element in the same general direction as the axis of the cylinder and being devoid of mechanical connection therewith.

ARNOLD E. W. JOHNSON.